United States Patent
Ko et al.

(10) Patent No.: US 11,935,172 B2
(45) Date of Patent: Mar. 19, 2024

(54) METHOD, SYSTEM, AND NON-TRANSITORY COMPUTER READABLE RECORD MEDIUM FOR EXPRESSING EMOTION IN CONVERSATION MESSAGE USING GESTURE

(71) Applicant: LINE Plus Corporation, Seongnam-si (KR)

(72) Inventors: Se Hyun Ko, Seongnam-si (KR); Soyeon Han, Seongnam-si (KR); Keon Hong Lee, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 0 days.

(21) Appl. No.: 17/991,469

(22) Filed: Nov. 21, 2022

(65) Prior Publication Data

US 2023/0082074 A1    Mar. 16, 2023

Related U.S. Application Data

(63) Continuation of application No. 17/131,037, filed on Dec. 22, 2020, now Pat. No. 11,538,212.

(30) Foreign Application Priority Data

Dec. 24, 2019    (KR) .................. 10-2019-0174362

(51) Int. Cl.
*G06T 13/40* (2011.01)
*G06F 3/04883* (2022.01)

(52) U.S. Cl.
CPC .......... *G06T 13/40* (2013.01); *G06F 3/04883* (2013.01); *G06F 2203/04104* (2013.01)

(58) Field of Classification Search
None
See application file for complete search history.

(56) References Cited

U.S. PATENT DOCUMENTS

| | | | |
|---|---|---|---|
| 2012/0166665 | A1 | 6/2012 | Martin |
| 2014/0082520 | A1* | 3/2014 | Mamoun .......... H04M 1/72427 715/752 |
| 2014/0143682 | A1 | 5/2014 | Druck |
| 2015/0121251 | A1 | 4/2015 | Kadirvel et al. |
| 2017/0286366 | A1 | 10/2017 | Chang et al. |
| 2018/0054466 | A1 | 2/2018 | Blattner et al. |

FOREIGN PATENT DOCUMENTS

KR    10-2002-0074304 A    9/2002

\* cited by examiner

*Primary Examiner* — Yi Wang
(74) *Attorney, Agent, or Firm* — Sughrue Mion, PLLC

(57) ABSTRACT

A method, a system, and a non-transitory computer readable record medium for expressing an emotion in a conversation message using a gesture are provided. A message expression method may include: receiving a message that is entered in a message input area of a chatroom; obtaining animation information based on an input applied to the message in the message input area; modifying the message based on the animation information; and displaying the modified message in a chat view area of the chatroom in response to receiving a message send request.

17 Claims, 10 Drawing Sheets

FIG. 5

| Gesture or touch input (501) | Animation (502) |
|---|---|
| Left-to-right swipe | Shake |
| Double tap | Break |
| Upper end drag | Increase (or fade in) |
| Lower end drag | Decrease (or fade out) |
| ... | ... |

METHOD, SYSTEM, AND NON-TRANSITORY COMPUTER READABLE RECORD MEDIUM FOR EXPRESSING EMOTION IN CONVERSATION MESSAGE USING GESTURE

CROSS-REFERENCE TO RELATED APPLICATION

This application is a continuation application of U.S. application Ser. No. 17/131,037, filed on Dec. 22, 2020, which claims priority from Korean Patent Application No. 10-2019-0174362, filed Dec. 24, 2019 in the Korean Intellectual Property Office, the disclosures of which are incorporated herein by reference in their entireties.

BACKGROUND

1. Field

Apparatuses and methods consistent with example embodiments relate to expressing an emotion of a user in a conversation message.

2. Description of Related Art

An instant messenger application or software program may allow users to send and receive messages or data in real time. A user may register a contact on a messenger application and may exchange messages with a counterpart on a contact list in real time.

Such a messenger function is popular in a mobile environment of a mobile communication terminal as well as a personal computer (PC).

With the increasing popularity of an instant messenger and diversity of functions provided through the instant messenger, a function of sharing a variety of information and contents, such as, for example, photos, videos, files, contacts, locations, schedules, public notices, and votes, and an interaction with other services, such as, for example, a game service and a video service, is being supported.

SUMMARY

One or more example embodiments provide an apparatus or a method for expressing an emotion of a user in a conversation message through a gesture by matching the gesture and a corresponding emotional expression.

Further, one or more example embodiments provide recognizing a gesture for a conversation message being input in a chatroom and applying an animation effect corresponding to the gesture to the corresponding conversation message.

According to an aspect of an example embodiment, there is provided a message expression method a message expression method implemented by a computer apparatus comprising at least one processor configured to execute computer-readable instructions comprised in a memory, the method including: receiving a message that is entered in a message input area of a chatroom; obtaining animation information based on an input applied to the message in the message input area; modifying the message based on the animation information; and displaying the modified message in a chat view area of the chatroom in response to receiving a message send request.

The input applied to the message in the message input area may be a touch input that is formed with a plurality of touch actions, and the obtaining animation information may include converting the touch input to custom animation information by storing the plurality of touch actions in temporal order.

The obtaining animation information may include: converting the touch input to a predefined animation effect in response to presence of the predefined animation effect that corresponds to the touch input; converting the touch input to custom animation effect by storing a plurality of touch actions of the touch input in temporal order in response to absence of the predefined animation effect that corresponds to the touch input; and obtaining the predefined animation effect or the custom animation effect as the animation information.

The converting the touch input to the custom animation information may include creating custom animation data that comprises a touch coordinates sequence in which touch coordinates of the plurality of touch actions that occur at a certain time interval are stored in temporal order.

The converting the touch input to the custom animation information may include creating custom animation data that comprises a touch type sequence in which touch types of the plurality of touch actions that occur at a certain time interval are stored in temporal order.

The message expression method may further include: setting a gesture recognition area for recognizing the input in response to activation of a keyboard in the chatroom.

The message expression method may further include: setting a gesture recognition area for recognizing the input in response to activation of a preview for the message in the chatroom.

The message may be entered by a first electronic device of a first user, and the animation information may be sent to a second electronic device of a second user after data optimization is performed at a server.

The message may be entered by a first electronic device of a first user, and the animation information may be replaced with another animation information and sent to a second electronic device of a second user.

The message may be entered by a first electronic device of a first user, and the message may be converted to a message type of an animation file based on the animation information and then sent to a second electronic device of a second user.

According to an aspect of another example embodiment, there is provided a non-transitory computer-readable storage medium storing instructions that is executable by the at least one processor to perform the message expression method.

According to an aspect of another example embodiment, there is provided a computer apparatus including: at least one memory configured to store computer-readable instructions; and at least one processor configured to execute the computer-readable to: receive a message that is entered in a message input area of a chatroom; obtaining animation information based on an input applied to the message in the message input area; modify the message based on the animation information; and display the modified message in a chat view of the chatroom in response to receiving a message send request.

The input applied to the message in the message input area may be a touch input that is formed with a plurality of touch actions. The at least one processor may be further configured to execute the computer-readable to: convert the touch input to custom animation information by storing the plurality of touch actions in temporal order.

The at least one processor may be further configured to execute the computer-readable to: convert the touch input to a predefined animation effect in response to presence of the predefined animation effect that corresponds to the touch input; convert the touch input to custom animation effect by storing a plurality of touch actions of the touch input in temporal order in response to absence of the predefined animation effect that corresponds to the touch input; and obtain the predefined animation effect or the custom animation effect as the animation information.

The at least one processor may be further configured to execute the computer-readable to: create custom animation data that comprises a touch coordinates sequence in which touch coordinates of the plurality of touch actions that occur at a certain time interval are stored in temporal order.

The at least one processor may be further configured to execute the computer-readable to: create custom animation data that comprises a touch type sequence in which touch types of the plurality of touch actions that occur at a certain time interval are stored in temporal order.

The at least one processor may be further configured to execute the computer-readable to: set a gesture recognition area for recognizing the input in response to activation of a keyboard in the chatroom.

The at least one processor may be further configured to execute the computer-readable to: set a gesture recognition area for recognizing the input in response to activation of a preview for the message in the chatroom.

The message may be entered by a first electronic device of a first user, and the animation information may be sent to a second electronic device of a second user after data optimization is performed at a server.

The message may be entered by a first electronic device of a first user, and the message may be converted to a message type of an animation file based on the animation information and then sent to a second electronic device of a second user.

BRIEF DESCRIPTION OF THE FIGURES

The above and/or other aspects will be more apparent by describing certain example embodiments, with reference to the accompanying drawings, in which:

FIG. 5 illustrates an example of an animation type predefined for each gesture according to at least one example embodiment;

DETAILED DESCRIPTION

Figure 1:
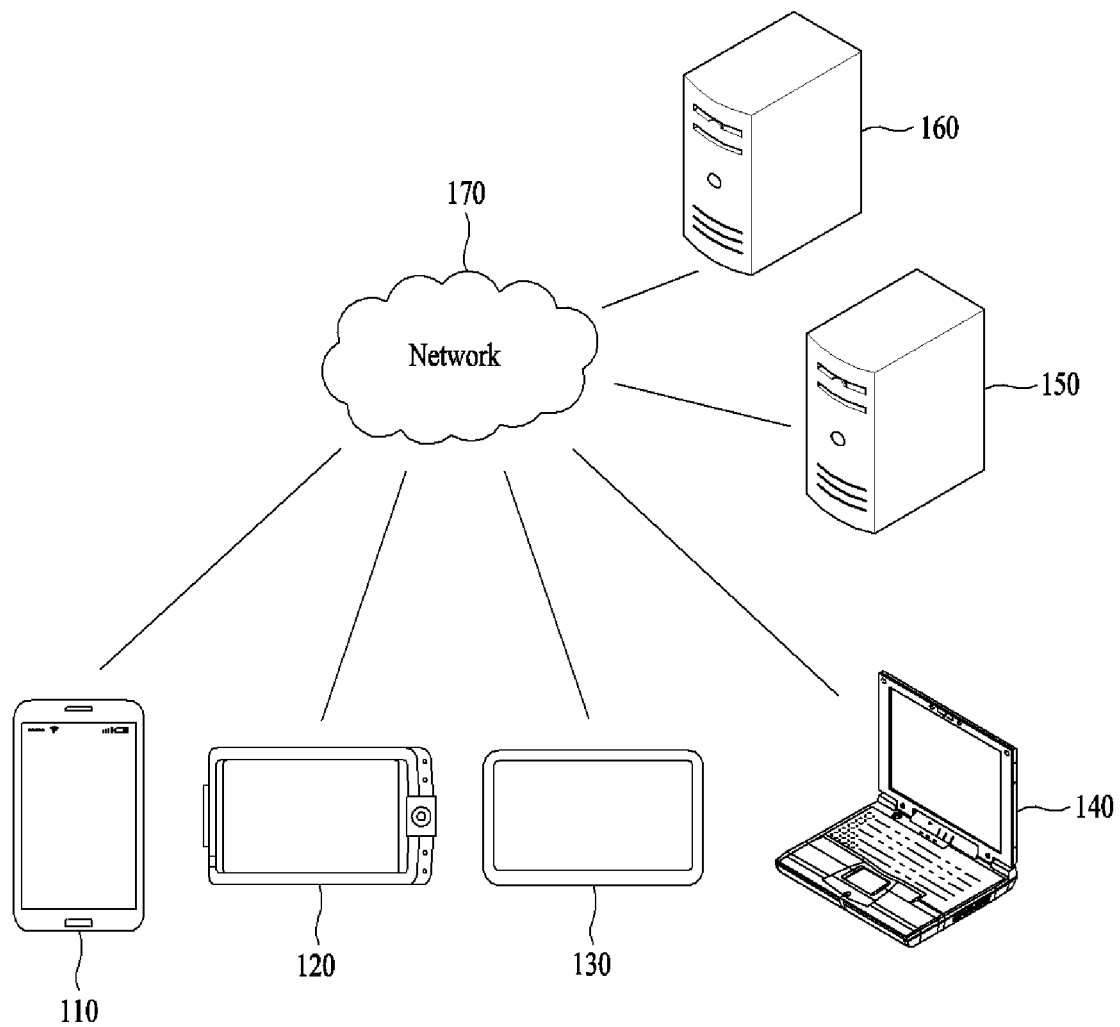
FIG. 1 is a diagram illustrating an example of a network environment according to at least one example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer record medium or device, capable of providing instructions or data to, or being interpreted by, a hardware device. The software also may be distributed over network coupled computer systems so that the software is stored and executed in a distributed fashion. In particular, for example, software and data may be stored by one or more computer readable record mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable record medium into the one or more storage devices and/or one or more computer processing devices using a drive mechanism. Such separate computer readable record medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable record medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments are described with reference to the accompanying drawings.

The example embodiments relate to technology for expressing an emotion of a user sending a conversation message in the corresponding conversation message.

The example embodiments including the disclosures herein may aggressively express an emotion of a user through a gesture by matching the gesture and a corresponding emotion expression.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto.

Each of the plurality of electronic devices 110, 120, 130, and 140 may be a stationary terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, a game console, a wearable device, an Internet of things (IoT) device, a virtual reality (VR) device, an augmented reality (AR) device, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, a satellite network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a first service to the plurality of electronic devices 110, 120, 130, and 140 connected over the network 170. The server 160 may be a system that provides a second service to the plurality of electronic devices 110, 120, 130, and 140 connected over the network 170. In detail, the server 150 may provide, as the first service, a service (e.g., a messenger service, etc.) intended by an application through the application as a computer program installed and executed on the plurality of electronic devices 110, 120, 130, and 140. As another example, the server 160 may provide, as the second service, a service that distributes a file for installing and executing the application to the plurality of electronic devices 110, 120, 130, and 140.

Figure 2:
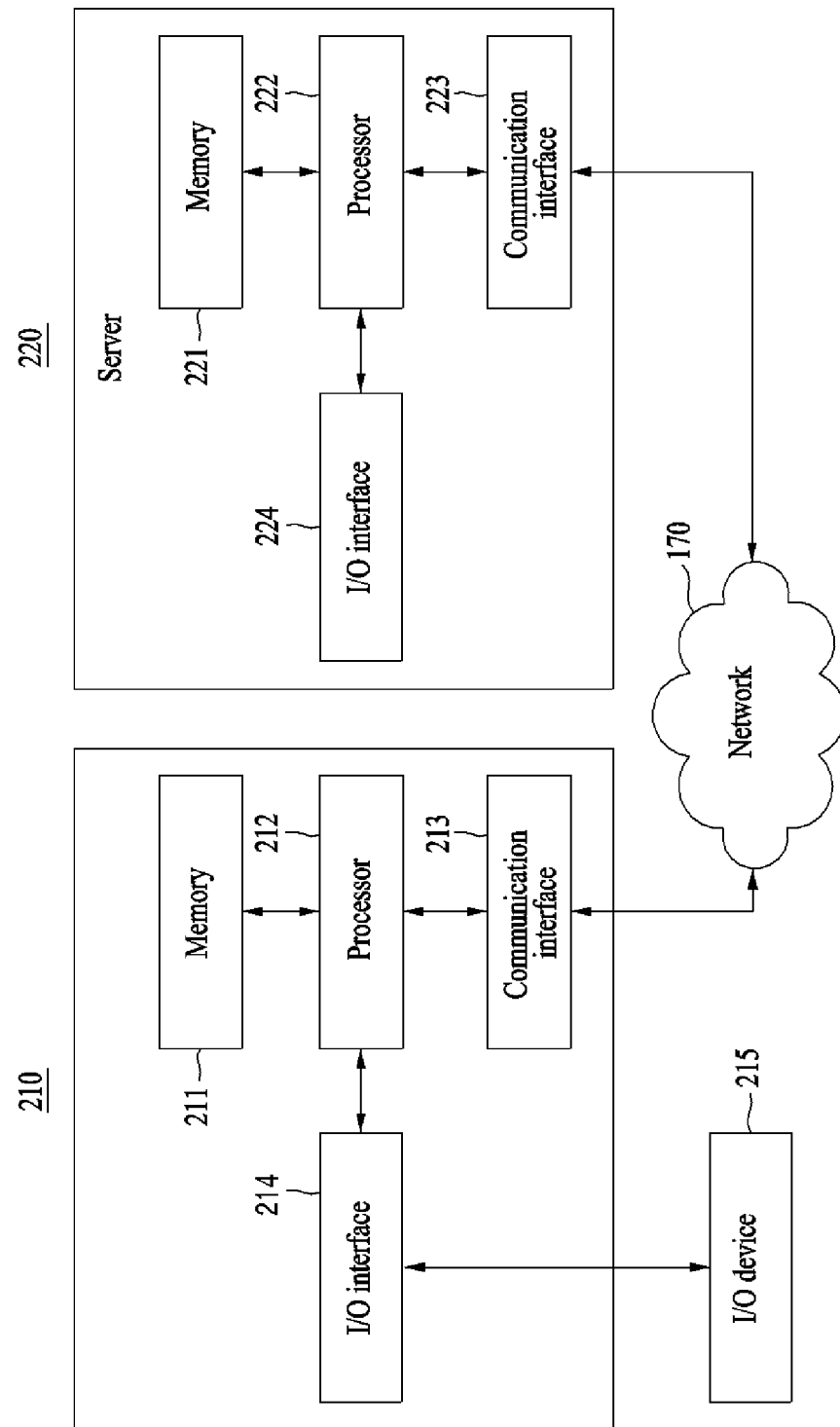
FIG. 2 is a diagram illustrating an example of an electronic device and a server according to at least one example embodiment.

FIG. 2 is a block diagram illustrating an example of a client device 210 and a server 220 according to at least one example embodiment. The client device 210 may correspond to any of the electronic devices 110, 120, 130, and 140 shown in FIG. 1, and the server 220 may correspond to any of the servers 150 and 160 shown in FIG. 1.

Referring to FIG. 2, the client device 210 may include a memory 211, a processor 212, a communication interface 213, and an input/output (I/O) interface 214, and the server 220 may include a memory 221, a processor 222, a communication interface 223, and an I/O interface 224. The memory 211, 221 may include a permanent mass storage device, such as random access memory (RAM), a read only memory (ROM), a disk drive, a solid state drive (SSD), a flash memory, etc., as a non-transitory computer-readable record medium. The permanent mass storage device, such as ROM, SSD, flash memory, and disk drive, may be included in the client device 210 or the server 220 as a permanent storage device separate from the memory 211, 221. Also, an OS and at least one program code, for example, a code for a browser installed and executed on the client device 210 or an application installed and executed on the client device 210 to provide a specific service, may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 211, 221 through the communication interface 213, 223, instead of the non-transitory computer-readable record medium. For example, at least one program may be loaded to the memory 211, 221 based on a computer program, for example, the application, installed by files provided over the network 170 from developers or a file distribution system, for example, the server 220, providing an installation file of the application.

The processor 212, 222 may be configured to process instructions of a computer program by performing basic arithmetic operations, logic operations, and I/O operations. The computer-readable instructions may be provided from the memory 211, 221 or the communication interface 213, 223 to the processor 212, 222. For example, the processor 212, 222 may be configured to execute received instructions in response to the program code stored in the storage device, such as the memory 211, 221.

The communication interface 213, 223 may provide a function for communication between the client device 210 and the server 150 over the network 170 and may provide a function for communication between the client device 210 and another client device or another server, and between the server 220 and another client device or server. For example, the processor 212 of the client device 210 may transfer a request created based on a program code stored in the storage device such as the memory 211, to the server 220 over the network 170 under control of the communication interface 213. The client device 210 may receive a control signal, an instruction, content, a file, etc., provided under control of the processor 222 of the server 220 through the communication interface 213 of the client device 210 from the communication interface 223 of the server 220. For example, a control signal, an instruction, content, a file, etc., of the server 220 received through the communication interface 213 may be transferred to the processor 212 or the memory 211, and content, a file, etc., may be stored in a storage medium, for example, the permanent storage device, further includable in the client device 210.

The I/O interface 214 may be a device used for interface with an I/O apparatus 215. For example, an input device may include a device, such as a keyboard, a mouse, a microphone, a camera, etc., and an output device may include a device, such as a display, a speaker, a haptic feedback device, etc. As another example, the I/O interface 214 may be a device for interface with an apparatus in which an input function and an output function are integrated into a single function, such as a touchscreen. The I/O apparatus 215 may be configured as a single device with the client device 210. Also, the I/O interface 224 of the server 220 may be a device for interface with an apparatus for input or output that may be connected to the server 220 or included in the server 220. In detail, when the processor 212 of the client device 210 processes an instruction of a computer program loaded to the memory 211, content or a service screen configured based on data provided from the server 220 or the electronic device 120 may be displayed on the display through the I/O interface 214.

According to other example embodiments, the client device 210 and the server 220 may include a smaller or greater number of components than a number of components shown in FIG. 2. For example, the client device 210 may include at least a portion of the I/O apparatus 215, or may further include other components, for example, a transceiver, a global positioning system (GPS) module, a camera, a variety of sensors, a database (DB), and the like. In detail, if the client device 210 is a smartphone, the client device 210 may be configured to further include a variety of components, for example, an acceleration sensor, a gyro sensor, a camera module, various physical buttons, a button using a touch panel, an I/O port, a vibrator for vibration, etc., which are generally included in the smartphone.

Hereinafter, a method and system for expressing an emotion in a conversation message using a touch or gesture input according to example embodiments is described.

Figure 3:
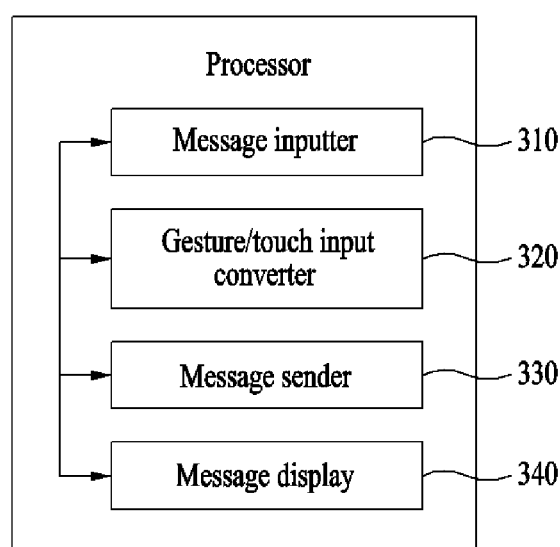
FIG. 3 is a diagram illustrating an example of components includable in a processor of an electronic device according to at least one example embodiment.
Figure 4:
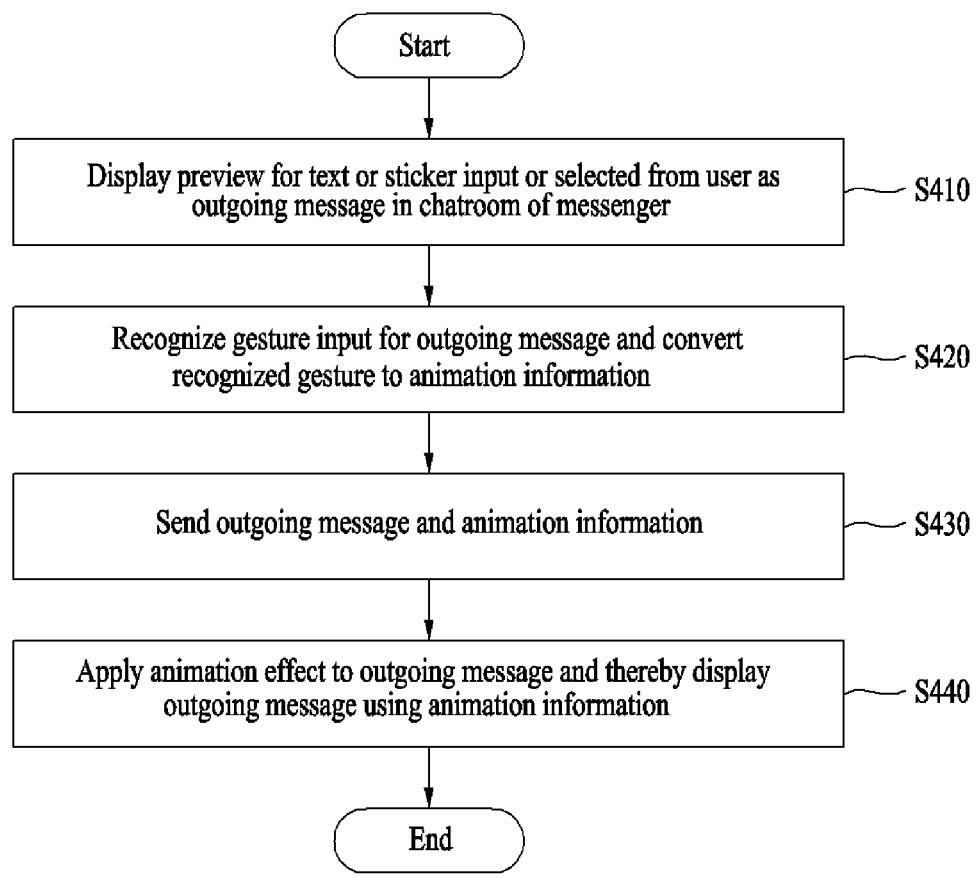
FIG. 4 is a flowchart illustrating an example of a method performed by an electronic device according to at least one example embodiment.

FIG. 3 is a diagram illustrating an example of components includable in a processor of an electronic device according to at least one example embodiment, and FIG. 4 is a flowchart illustrating an example of a method performed by an electronic device according to at least one example embodiment.

A message expression system implemented as a computer may be configured in the client device 210 according to the example embodiment. For example, the message expression system may be configured in a form of a program that independently operates or may be configured in an in-app form of a specific application to be operable on the specific application, and, depending on example embodiments, may provide a messenger service through interaction with the server 220.

A message expression system configured in the client device 210 may perform a message expression method of FIG. 4 in response to an instruction provided from an application installed on the client device 210.

Referring to FIG. 3, to perform the message expression method of FIG. 4, the processor 212 of the client device 210 may include a message inputter 310, a gesture/touch input converter 320, a message sender 330, and a message display 340. The gesture/touch input converter 320 may be also referred to as an input converter, a gesture input converter, or a touch input converter. Depending on example embodiments, components of the processor 212 may be included in or excluded from the processor 212. Also, depending on example embodiments, components of the processor 212 may be separated or merged for functional representation of the processor 212.

The processor 212 and the components of the processor 212 may control the client device 210 to perform operations S410 to S430 included in the message expression method of FIG. 4. For example, the processor 212 and the components of the processor 212 may be configured to execute a code of at least one program and a code of an OS included in the memory 211.

Here, the components of the processor 212 may be representations of different functions of the processor 212 performed by the processor 212 in response to an instruction (e.g., an instruction provided from an application executed on the client device 210), provided from a program code stored in the client device 210. For example, the message inputter 310 may be used as a functional representation of the processor 212 to control the client device 210 to input a conversation message to a message input box of a chatroom in response to the instruction.

The processor 212 may read instructions that are stored in the memory 211 to control of the client device 210. In particular, the read instructions may include an instruction for controlling the processor 212 to perform the following operations S410 to S430.

Referring to FIG. 4, in operation S410, the message inputter 310 may receive a conversation message (hereinafter, an outgoing message) for sending a text or a sticker input or selected from a user of the client device 210 in a chatroom of a messenger installed on the client device 210 and may provide a preview for the text or the sticker input or selected for message sending.

Herein, the sticker refers to an image-type expression method available to express an emotion or an intent of the user in a messenger and may inclusively indicate various types of graphic contents that include an image, a flash, and animation.

A preview for the text may be provided by immediately inputting the text to a message input box of the chatroom according to typing through the keyboard. Meanwhile, in response to a selection on the sticker from a recommendation list associated with a text input to the message input box or a direct selection on a sticker screen that provides the entire list, a preview for the sticker may be provided by displaying a preview layer of the corresponding sticker to be overlaid at a preset location in the chatroom, for example, in the message input box or an adjacent area of the message input box.

In operation S420, the gesture/touch input converter 320 may recognize a gesture or touch input for the outgoing message and may convert the recognized gesture or touch input to animation information. In response to recognizing a touch on a preview screen of the text or the sticker input or selected as the outgoing message, the gesture/touch input converter 320 may analyze the recognized touch gesture and may create animation information corresponding to the gesture or touch input. Here, the animation information may include an animation effect corresponding to the gesture or touch input as a visual or animation effect applicable to the message.

For example, the gesture/touch input converter 320 may recognize a gesture or touch input for a preview of a text or a sticker (e.g., a touch input that is applied to a message that is entered in a message input area of a chat room but is displayed in a chat view area of the chat room) and may convert the recognized gesture or touch input to a predefined animation. For example, referring to FIG. 5, a gesture-by-animation matching table may be constructed in which an animation effect 502, such as shake, break, shutter, increase, decrease, fade in, fade out, etc., is predefined based on a gesture or touch input type 501. The gesture/touch input converter 320 may convert a gesture or touch input for a preview of a text or a sticker to existing defined animation type information.

As another example, the gesture/touch input converter 320 may recognize a gesture or touch input for a preview of a text or a sticker and may convert the recognized gesture or touch input to a custom animation to which a trajectory or a pattern of the recognized gesture is applied. The gesture/touch input converter 320 may create the custom animation by storing a touch input (e.g., a plurality of touch actions that forms the touch input) of a user of a desired time interval in temporal order. For example, the gesture/touch input converter 320 may create custom animation data that includes, as touch coordinates by time, a touch coordinates sequence <[time1, touch coordinates (100,200)], [time2, touch coordinates (200,200)], [time3, touch coordinates (300,200)], [time4, touch coordinates (400,200)]>. Alternatively, the gesture/touch input converter 320 may create custom animation data that includes, as a touch type by time, a touch type sequence <[time1, swipe left], [time2, swipe right], [time3, long click], [time4, double tap]>.

As another example, the gesture/touch input converter 320 may recognize a gesture or touch input for a preview of a text or a sticker and, in response to presence of an animation predefined for the recognized gesture or touch input, may convert the recognized gesture or touch input to the predefined animation and, in response to absence of the predefined animation, may convert the gesture or touch input to a custom animation to which a trajectory or a pattern of the recognized gesture or touch input is applied as is.

Referring again to FIG. 4, in operation S430, the message sender 330 may send, to the server 220, the outgoing message input in operation S410 and the animation information converted in operation S420 in response to a message sending request from the user of the client device 210, to transfer the message and the animation information to a counterpart of the chatroom. In response to presence of the predefined animation, type information of the animation is sent with the outgoing message. In the case of the custom animation, animation data created as a touch input sequence according to the gesture may be sent with the outgoing message. The server 220 may send information, for example, the outgoing message and the animation information, transferred from the client device 210 to another client device (e.g., from one of the electronic devices 120, 130, and 140 to another one of the electronic devices 120, 130, and 140) included in the chatroom.

In another example embodiment, operation S420 may be performed by the server 220, for example, based on the matching table shown in FIG. 5, and in such a case, the matching table may be stored in the server 200 and operation S430 may be omitted.

In operation S440, in displaying the outgoing message sent to the electronic device of the other user, the message display 340 may apply an animation effect to the outgoing message and thereby display the outgoing message using the animation information. Even in the case of displaying a conversation message (hereinafter, an incoming message) received from the electronic device of the other user, if animation information is received with the incoming message, the message display 340 may apply an animation effect to the incoming message and thereby display the incoming message using the received animation information. In another example embodiment, operation S440 may be performed by the server 220. For example, the server 200 may modify the outgoing message by applying an animation effect thereto, and may display the modified outgoing message in a chat view area of a chat room in which the client device 210 participates in.

The electronic device of the other user may display the outgoing message transferred from the client device 210 on a screen and, here, may apply an animation effect to the outgoing message based on the animation information transferred with the outgoing message. In the case of the predefined animation, animation data required to exhibit an animation by type may be mounted to a messenger installed on the electronic device of the other user. In the case of the custom animation, an animation effect may be reproduced based on animation data transferred from the client device 210.

Depending on example embodiments, the server 220 may perform an efficiency operation for data optimization, such as compressing data, reducing a data length, and replacing data with another data, before sending data transferred from the client device 210 to another client device of a conversation partner. For example, if animation data transferred from the client device 210 exceeds a desired size due to the efficiency operation in terms of traffic, the corresponding animation may be replaced with a similar animation with a smaller data size and thereby transferred. As another example, the server 220 may convert the outgoing message transferred from the client device 210 to an animation message that is a new message type based on the transferred outgoing message and animation information and may send the converted animation message. That is, the server 220 may apply animation data corresponding to a gesture of the user of the client device 210 to the outgoing message transferred from the client device 210 and thereby convert a message type to an animation file, for example, a GIF file, and may send the converted message.

The example embodiments may express various emotions in a conversation message by representing an animation effect corresponding to a gesture in the conversation message based on a user gesture to the conversation message being input.

FIGS. 6 to 10 illustrate examples of a user interface screen for describing a process of expressing an emotion of a user in a conversation message through a gesture according to at least one example embodiment. The user interface screen of a chatroom 600 may include a keyboard 610 that allows a user to type a message (including text, characters, symbols, and the like) in a message input area 630, a gesture or touch input recognition area 620 that receives a gesture or touch input that is to be applied to the message in the message input area 630, the message input area 630 that allows the user to enter the message to be sent to a conversation partner, and a chat view area 640 that displays messages that have been sent to or received from the conversation partner.

Figure 6:
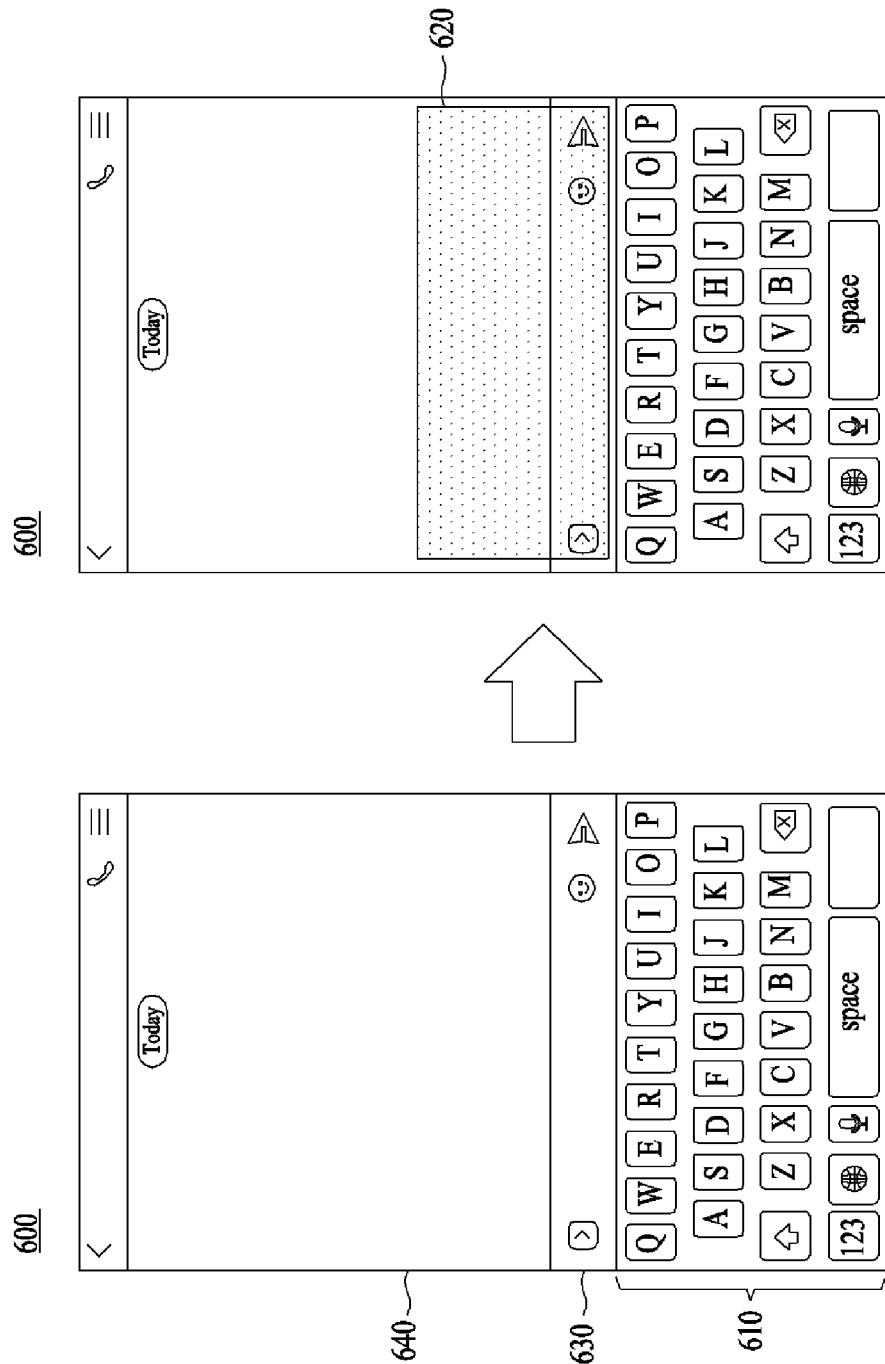
FIG. 6 illustrates an example of describing a process of setting an area for recognizing a gesture in a chatroom according to at least one example embodiment.

Referring to FIG. 6, in response to a user's selection, touch, or tap of the message input area (or a message input box) 630 in the chatroom 600, the processor 212 may activate and display the keyboard 610.

The processor 212 may set the gesture or touch input recognition area 620 for recognizing a gesture or touch input in the chatroom 600 in response to activation of the keyboard 610 in the chatroom 600 or in response to a message being entered in the message input area 630. For example, the processor 212 may set, as the gesture or touch input recognition area 620, a partial area in the chatroom 600, an area that includes at least a portion of the message input area 630 or the keyboard 610, or an area adjacent to the message input area 630 or the keyboard 610. The gesture or touch input recognition area 620 may include the entire message input area 630 and part of the chat view area 640, as shown in FIG. 6.

The gesture or touch input recognition area 620 functions to recognize a user gesture for a text or a sticker input or selected as an outgoing message as a transparent layer.

Although it is described that the gesture or touch input recognition area 620 is activated at a point in time at which the keyboard 610 is activated in the chatroom 600, it is provided as an example only. The gesture or touch input recognition area 620 may be set at a point in time at which a sticker screen for providing a sticker list for a sticker selection is activated. Also, the gesture or touch input recognition area 620 may be set at a point in time at which a preview for a text or a sticker created for message sending is executed.

Hereinafter, examples of expressing an emotion of a user using a gesture in a sticker selected for message sending are described.

Figure 7:
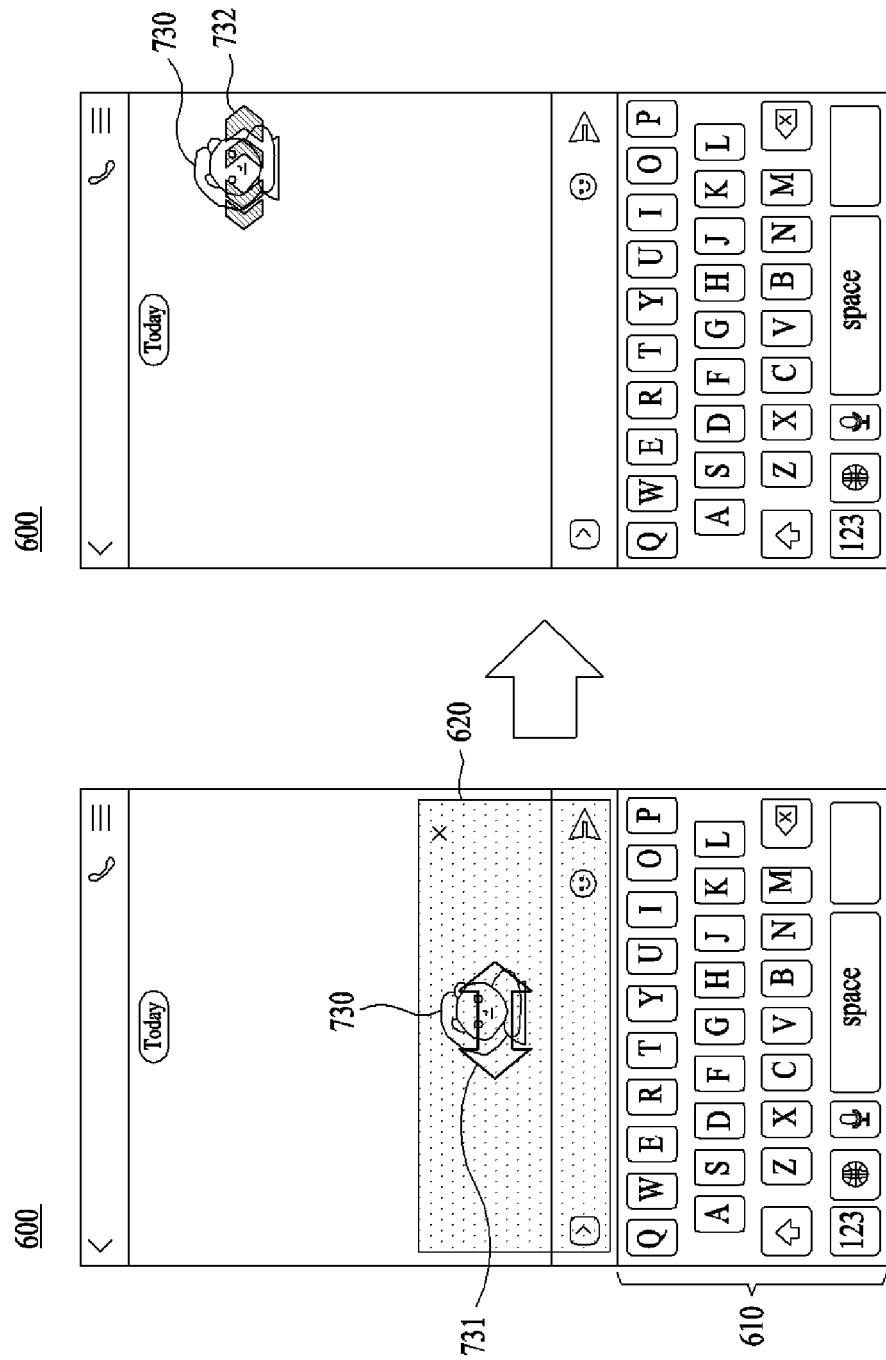
FIGS. 7 and 8 illustrate examples of a user interface screen for describing a process of expressing an emotion of a user through a gesture for a sticker input as a conversation message according to at least one example embodiment.

Referring to FIG. 7, in response to a selection from the user on a sticker 730 as a message the user desires to send to a counterpart in the chatroom 600, the processor 212 may provide a preview for the sticker 730 and may recognize a touch gesture input to the gesture or touch input recognition area 620. For example, in response to an input of a left-to-right swipe gesture 731 for moving the sticker 730 left and right, that, horizontally on the gesture or touch input recognition area 620, the processor 212 may convert the left-to-right swipe gesture 731 to animation information of a left-to-right shaking effect capable of expressing a kind of feeling of impatience. Here, in response to presence of an animation predefined for the left-to-right swipe gesture 731, the processor 212 may create animation data that includes type information of the corresponding animation. In response to absence of the predefined animation, the processor 212 may create custom animation data that includes a touch input sequence to which a touch input of a gesture input from the user is applied as is.

If the user inputs a gesture for the sticker 730 and then enters a send button, the processor 212 may release the gesture or touch input recognition area 620 in the chatroom 600 and, at the same time, may send, to the server 220, sticker information, for example, a sticker identifier, corresponding to the sticker 730 and animation information created through the user gesture.

The processor 212 may display the sticker 730 sent from the user on the chatroom 600 as a conversation message. Here, the processor 212 may express an emotion of the user by applying an animation effect 732 of shaking the sticker 730 left and right, that is, horizontally based on the animation information corresponding to the left-to-right swipe gesture 731. In the case of an animation predefined for the left-to-right swipe gesture 731, the processor 212 may apply the animation effect 732 of shaking the sticker 730 left and right at a preset magnitude and speed. In the case of a custom animation, the processor 212 may apply the animation effect 732 of shaking the sticker 730 left and right at a magnitude and a speed of the gesture input from the user.

Figure 8:
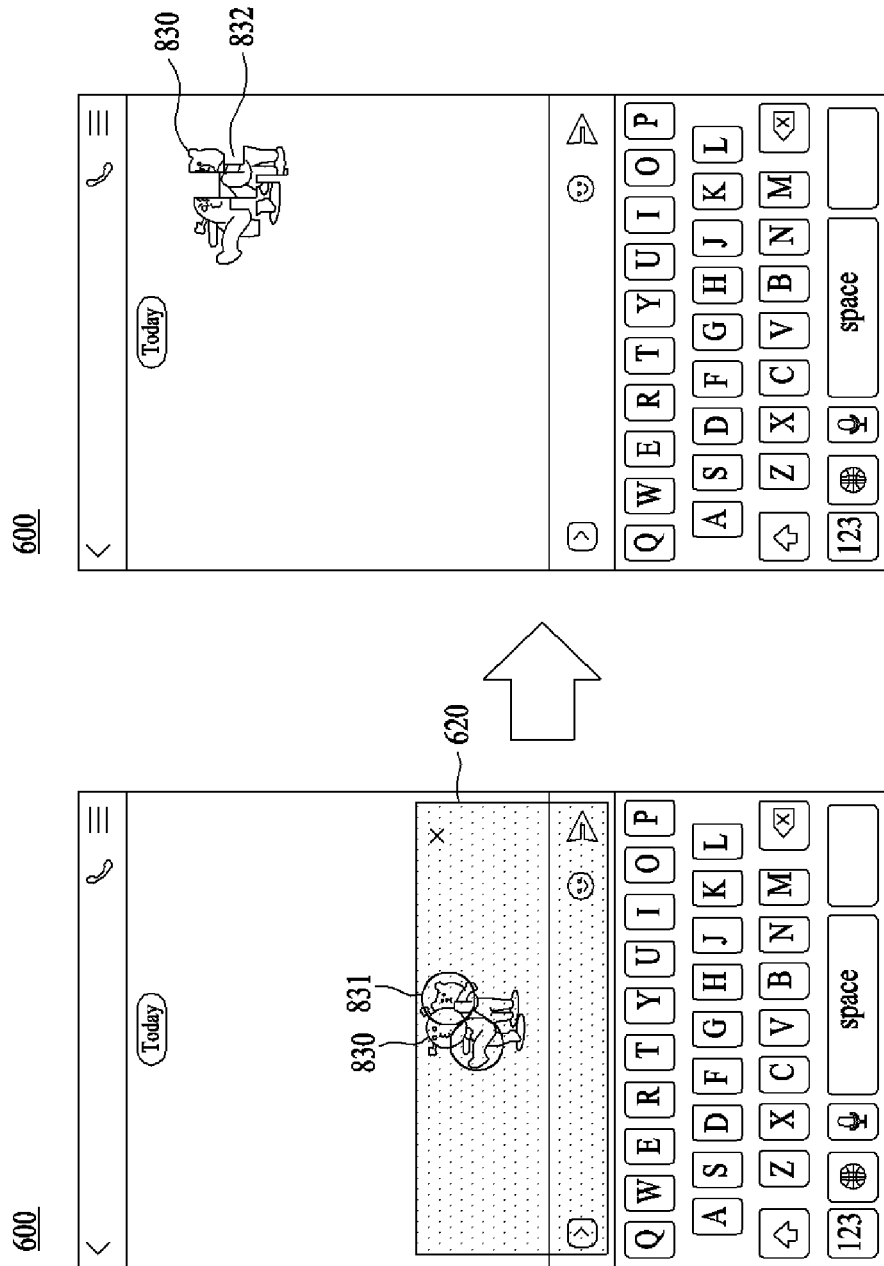

Referring to FIG. 8, in response to a selection from the user on a sticker 830 as a message the user desires to send to a counterpart in the chatroom 600, the processor 212 may provide a preview for the sticker 830 and, here, may recognize a touch gesture input to the gesture or touch input recognition area 620. For example, in response to a user input of a double-tap gesture 831 that the user simultaneously touches the sticker 830 with multiple fingers on the gesture recognition or touch input area 620, the processor 212 may convert the double-tap gesture 831 to a shutter effect capable of expressing a kind of feeling of anger. Here, in response to presence of an animation predefined for the double-tap gesture 831, the processor 212 may create animation information that includes type information of the corresponding animation. In response to absence of the predefined animation, the processor 212 may create custom animation data that includes a touch input sequence in which a touch input of a gesture input from the user is applied as is.

If the user inputs a gesture for the sticker 830 and then enters a send button, the processor 212 may release the gesture or touch input recognition area 620 in the chatroom 600 and, at the same time, may send, to the server 220, sticker information corresponding to the sticker 830 and animation information created through the user gesture.

The processor 212 may display the sticker 830 sent from the user on the chatroom 600 as a conversation message. Here, the processor 212 may express an emotion of the user by applying an animation effect 832 that an image of the sticker 830 is shuttered based on the animation information corresponding to the double-tap gesture 831. In the case of an animation predefined for the double-tap gesture 831, the processor 212 may apply the animation effect 832 to the sticker 830 so that the image of the sticker 830 is shuttered in a predetermined (or, alternatively, desired) pattern or a plurality of pixels of the image of the sticker 830 are jumbled in a predetermined pattern. In the case of a custom animation, the processor 212 may apply the animation effect 832 to the sticker 830 so that a plurality of pixels of the image of the sticker 830 are mixed or jumbled in a pattern customized by the user.

In addition, the processor 212 may express the emotion of the user by applying an animation effect to the sticker 830 so that a size of the sticker 830 increases or the sticker 830 is zoomed or faded in, in response to the user inputting an upper end drag in a sticker preview state. Also, the processor 212 may apply an animation effect to the sticker 830 so that a size of the sticker 830 decreases or the sticker 830 is zoomed or faded out, in response to the user inputting a lower end drag in the sticker preview state.

Hereinafter, examples of a process of expressing an emotion of a user using a gesture for a text input for message sending are described.

Figure 9:
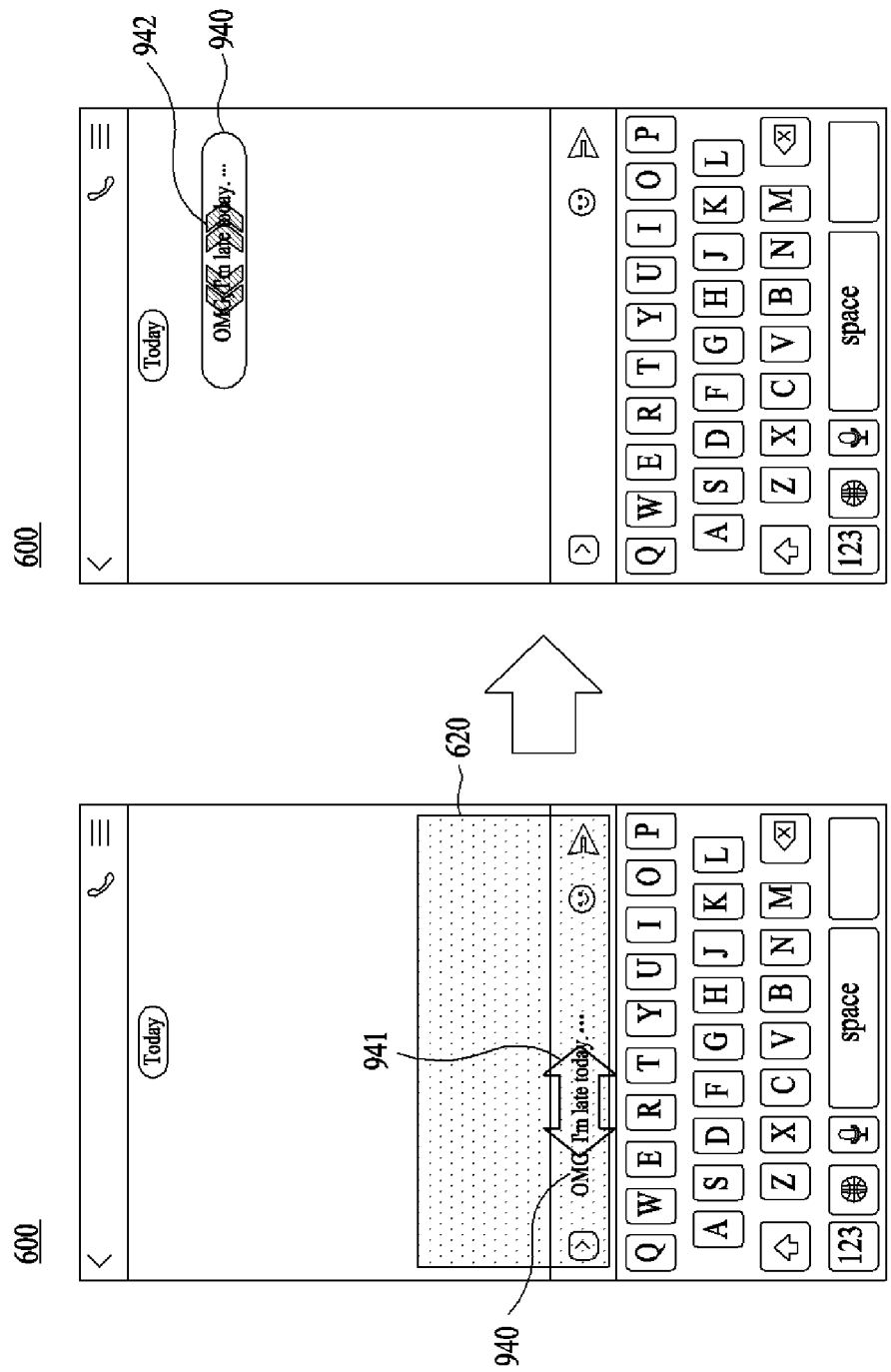
FIGS. 9 and 10 illustrate examples of a user interface screen for describing a process of expressing an emotion of a user through a gesture for a text input as a conversation message according to at least one example embodiment.

Referring to FIG. 9, in response to an input of a text 940 from the user as a message the user desires to send to a counterpart in the chatroom 600, the processor 212 may display the text 940 on a message input box at the same time at which the text 940 is input and, here, may recognize a touch gesture or touch input to the gesture or touch input recognition area 620. For example, in response to a user input of a left-to-right swipe gesture 941 for moving the text 940 left and right, that is, horizontally in the gesture or touch input recognition area 620, the processor 212 may convert the left-to-right swipe gesture 941 to animation information of a side-to-side shaking effect capable of expressing a kind of feeling of impatience. That is, the processor 212 may obtain or generate the animation information based on the left-to-right swipe gesture 941. Here, in response to presence of an animation predefined for the left-to-right swipe gesture 941, the processor 212 may create animation data that includes type information of the corresponding animation. In response to absence of the predefined animation, the processor 212 may create custom animation data that includes a touch input sequence in which a touch input of a gesture input from the user is applied as is.

If the user inputs a gesture for the text 940 and then enters a send button, the processor 212 may release the gesture or touch input recognition area 620 in the chatroom 600 and, at the same time, may send, to the server 220, message information that includes the text 940 and animation information created through the user gesture.

The processor 212 may display the text 940 sent from the user on the chatroom 600 as a conversation message. Here, the processor 212 may express an emotion of the user by applying an animation effect 942 of shaking the text 940 left to right, that is, horizontally based on the animation information corresponding to the left-to-right swipe gesture 941. In the case of an animation predefined for the left-to-right swipe gesture 941, the processor 212 may apply the animation effect 942 of shaking the text 940 left to right in a preset direction and at a preset speed. In the case of a custom animation, the processor 212 may apply the animation effect 942 of shaking the text 940 left to right as is in a direction and at a speed of the gesture input from the user.

Figure 10:
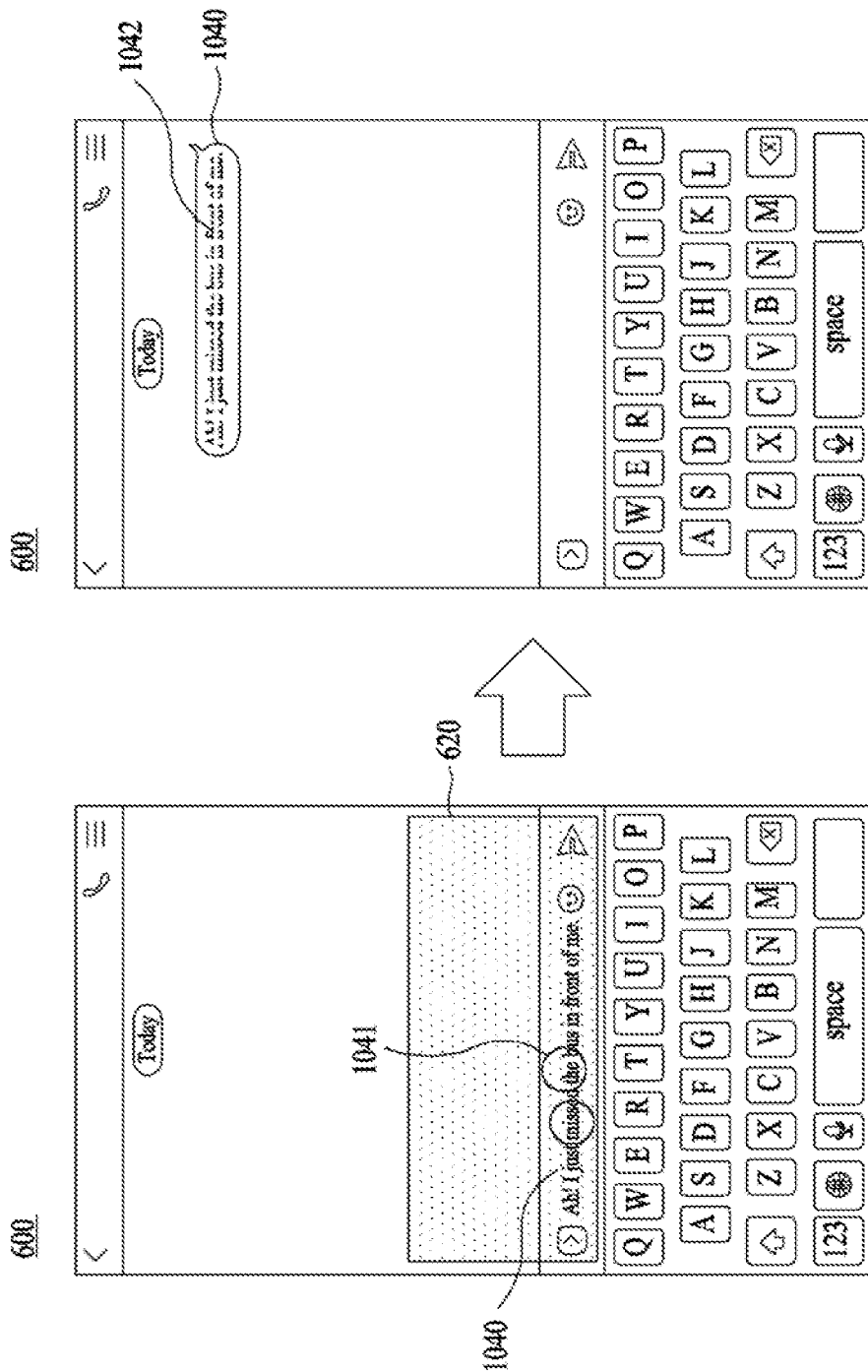

Referring to FIG. 10, in response to an input of a text 1040 from the user as a message the user desires to send to a counterpart in the chatroom 600, the processor 212 may display the input text 1040 on a message input box at the same time at which the text 1040 is input and, here, may recognize a touch gesture input to the gesture or touch input recognition area 620. For example, in response to a user input of a double-tap gesture 1041 that the user simultaneously touches the text 1040 with multiple fingers on the gesture or touch input recognition area 620, the processor 212 may convert the double-tap gesture 1041 to animation information of a shatter or cross-out effect capable of expressing a kind of feeling of anger. Here, in response to presence of an animation predefined for the double-tap gesture 1041, the processor 212 may create animation data that includes type information of the corresponding animation. In response to absence of the predefined animation, the processor 212 may create custom animation data that includes a touch input sequence in which a touch input of a gesture input from the user is applied as is.

If the user inputs a gesture for the text 1040 and then enters a send button, the processor 212 may release the gesture or touch input recognition area 620 in the chatroom 600 and, at the same time, may send, to the server 220, message information that includes the text 1040 and animation information created through the user gesture.

The processor 212 may display the text 1040 sent from the user on the chatroom 600 as a conversation message. Here, the processor 212 may express an emotion of the user by applying an animation effect 1042 so that appearance of the text 1040 changes based on the animation information corresponding to the double-tap gesture 1041. In the case of an animation predefined for the double-tap gesture 1041, the processor 212 may apply the animation effect 1042 to the text 1040 so that the text 1040 is jumbled or distorted in a predetermined (or, alternatively, desired) pattern or is crossed out by including a strikethrough line, but is still readable. In the case of a custom animation, the processor 212 may apply the animation effect 1042 that the text 1040 breaks as is in a pattern input from the user.

In addition, the processor 212 may express the emotion of the user by applying an animation effect to the text 1040 so that a size of the text 1040 increases or the text 1040 is faded in, in response to the user inputting an upper end drag on the text 1040 input to the message input box, and by applying an animation effect to the text 1040 so that the a size of text 1040 decreases or the text 1040 is faded out in response to the user inputting a lower end drag on the text 1040.

In the case of the text 1040, the processor 212 may immediately apply an animation effect 1042 to the text 1040 based on an animation type and may also image the text 1040 and apply the animation effect. For example, the animation effect 1042 that the text 1040 breaks may be expressed by converting the text 1040 to an image and then breaking the converted image.

Although shake, break, increase, decrease, fade in, fade out, etc., are described as examples of an animation, they are provided as examples only. Any effects applicable to a conversation message, for example, a sticker or a message, may be applied.

According to some example embodiments, it is possible to exchange a conversation message that further effectively expresses an emotion of a user through a gesture by applying, to a corresponding message, an animation effect corresponding to the gesture input while creating the message and by matching the gesture and an emotion expression.

The systems or the apparatuses described herein may be implemented using hardware components, software components, and/or a combination thereof. For example, a processing device may be implemented using one or more general-purpose or special purpose computers, such as, for example, a processor, a controller, an arithmetic logic unit, a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, computer record medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable record mediums.

The methods according to the example embodiments may be recorded in non-transitory computer-readable storage media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable storage media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing embodiments are merely examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A message expression method implemented by a computer apparatus including a memory storing computer-readable instructions, and at least one processor configured to execute the computer-readable instructions, the message expression method comprising:

receiving a graphic content to be included in a message through a message input area of a chatroom;

receiving, from a user, a touch gesture applied to the graphic content displayed in a preview for the message, the touch gesture comprising a sequence or a pattern of touch actions applied by the user to the graphic content in the preview for the message; and in response to absence of a predefined animation corresponding to the sequence or the pattern of the touch actions applied by the user to the graphic content:

converting the sequence or the pattern of the touch actions applied by the user to the graphic content into at least one custom animation effect that corresponds to the sequence or the pattern of the touch actions applied by the user;

modifying the graphic content to include the at least one custom animation effect corresponding to the sequence or the pattern of the touch actions applied by the user; and displaying the modified graphic content with the at least one custom animation effect in a chat view area of the chatroom in response to receiving a message send request.

2. The message expression method of claim 1, wherein the graphic content includes a sticker image to express an emotion or an intent of the user in the chatroom, and the receiving the graphic content comprises:

receiving a text input to the message input area;

providing a recommendation list including a plurality of sticker images associated with the text input; and receiving the sticker image in responding to the sticker image being selected from the recommendation list.

3. The message expression method of claim 1, further comprising:

setting a gesture recognition area for recognizing the touch gesture in response to activation of a keyboard in the chatroom or in response to activation of the preview for the message in the chatroom.

4. The message expression method of claim 3, wherein the gesture recognition area is overlaid with at least part of the chat view area and the message input area.

5. The message expression method of claim 4, wherein the gesture recognition area includes a transparent layer for receiving the touch gesture applied to the graphic content.

6. The message expression method of claim 4, wherein the gesture recognition area is a preview layer for displaying the graphic content to preview the graphic content before sending the message including the graphic content.

7. The message expression method of claim 1, further comprising, in response to the presence of a predefined animation corresponding to the sequence or the pattern of the touch actions applied by the user to the graphic content:

converting the touch gesture to a predefined animation effect corresponding to the predefined animation; and modifying the graphic content to include the predefined animation effect; and displaying the modified graphic content with the predefined animation effect in the chat view area of the chatroom in response to receiving a message send request.

8. The message expression method of claim 1, wherein the at least one custom animation effect is based on a temporal order of the touch actions included in the sequence or the pattern.

9. A non-transitory computer-readable storage medium storing instructions that is executable by at least one processor to perform a message expression method comprising:

receiving a graphic content to be included in a message through a message input area of a chatroom;

receiving, from a user, a touch gesture applied to the graphic content displayed in a preview for the message, the touch gesture comprising a sequence or a pattern of touch actions applied by the user to the graphic content in the preview for the message; and in response to absence of a predefined animation corresponding to the sequence or the pattern of the touch actions applied by the user to the graphic content:

converting the sequence or the pattern of the touch actions applied by the user to the graphic content into at least one custom animation effect that corresponds to the sequence or the pattern of the touch actions applied by the user;

modifying the graphic content to include the at least one custom animation effect corresponding to the sequence or the pattern of the touch actions applied by the user; and displaying the modified graphic content with the at least one custom animation effect in a chat view area of the chatroom in response to receiving a message send request.

10. A computer apparatus comprising:

at least one memory configured to store computer-readable instructions; and at least one processor configured to execute the computer-readable instructions to:

receive a graphic content to be included in a message through a message input area of a chatroom;

receive, from a user, a touch gesture applied to the graphic content displayed in a preview for the message, the touch gesture comprising a sequence or a pattern of touch actions applied by the user to the graphic content in the preview for the message; and in response to absence of a predefined animation corresponding to the sequence or the pattern of the touch actions applied by the user to the graphic content:

convert the sequence or the pattern of the touch actions applied by the user to the graphic content into at least one custom animation effect that corresponds to the sequence or the pattern of the touch actions applied by the user;

modify the graphic content to include the at least one custom animation effect corresponding to the sequence or the pattern of the touch actions applied by the user; and display the modified graphic content with the at least one custom animation effect in a chat view area of the chatroom in response to receiving a message send request.

11. The computer apparatus of claim 10, wherein the graphic content includes a sticker image to express an emotion or an intent of the user in the chatroom, and the at least one processor is further configured to execute the computer-readable instructions to:

receive a text input to the message input area;

provide a recommendation list including a plurality of sticker images associated with the text input; and receive the sticker image in responding to the sticker image being selected from the recommendation list.

12. The computer apparatus of claim 10, wherein the at least one processor is further configured to execute the computer-readable instructions to:

set a gesture recognition area for recognizing the touch gesture in response to activation of a keyboard in the chatroom or in response to activation of the preview for the message in the chatroom.

13. The computer apparatus of claim 12, wherein the gesture recognition area is overlaid with at least part of the chat view area and the message input area.

14. The computer apparatus of claim 13, wherein the gesture recognition area includes a transparent layer for receiving the touch gesture associated with the graphic content.

15. The computer apparatus of claim 13, wherein the gesture recognition area is a preview layer for displaying the graphic content to preview the graphic content before sending the message including the graphic content.

16. The computer apparatus of claim 10, wherein the at least one processor is further configured to execute the computer-readable instructions to, in response to the presence of a predefined animation corresponding to the sequence or the pattern of the touch actions applied by the user to the graphic content:

convert the touch gesture to a predefined animation effect corresponding to the predefined animation;

modify the graphic content to include the predefined animation effect; and display the modified graphic content with the predefined animation effect in the chat view area of the chatroom in response to receiving a message send request.

17. The computer apparatus of claim 10, wherein the at least one custom animation effect is based on a temporal order of the touch actions included in the sequence or the pattern.

* * * * *